UNITED STATES PATENT OFFICE.

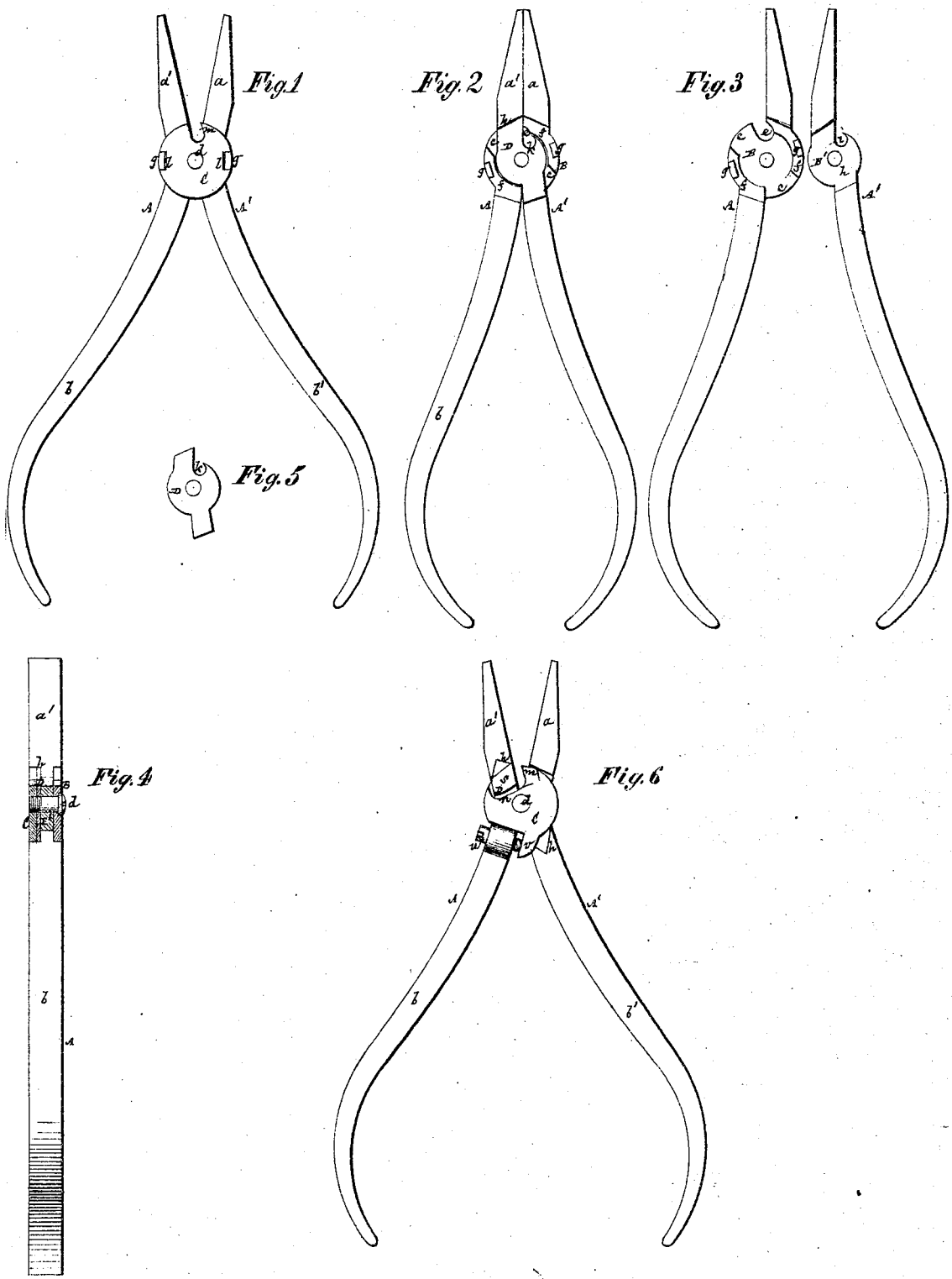

NATHAN THOMPSON, OF BROOKLYN, NEW YORK.

IMPROVEMENT IN PLIERS.

Specification forming part of Letters Patent No. 119,726, dated October 10, 1871; antedated October 7, 1871.

*To all whom it may concern:*

Be it known that I, NATHAN THOMPSON, of Brooklyn, in the county of Kings and State of New York, have invented a new and useful Holding-and-Cutting Pliers, of which the following is a full, clear, and exact description, reference being had to the accompanying drawing forming part of this specification.

The object of this invention is to combine in the one implement, in a simple and advantageous manner, both a holding and a cutting-pliers; and the invention consists in a novel construction of the knuckle of the pliers and providing it with detachable cutters. These cutters are formed separate from or independent of the limbs of the implement, and arranged on the one side only thereof by letting the one cutter into the recess in the edge of the one limb and depression in the face of its knuckle portion, subject to provision against turning, and making the other cutter in a cap or knuckle-plate fitted to the other limb of the implement and arranged to cover the first-mentioned cutter, the whole being bound or held together by the rivet or screw which constitutes the pivot of the pliers, and which is preferably made to pass through both cutters—through a male-knuckle portion of the one limb and through a female or box-like knuckle portion of the other limb. The cutters may be shaped either to have a nipping or a shearing action, and the one of them which is formed by the knuckle-plate made adjustable, if desired, relatively to the outer cutter and about the pivot of the implement, by means of a set-screw arranged to pass through the one limb and to bear as an adjustable stop on the knuckle-plate.

Having thus specified the object and nature of the invention, its description will be proceeded with in reference to the accompanying drawing. Figure 1 represents a side view of a pair of pliers constructed in accordance with the invention, and with its cutters formed to have a shearing action; Fig. 2, a similar view, showing said pliers closed and with the knuckle-plate that constitutes the one cutter removed. Fig. 3 is an interior side or face view of the two limbs of the instrument detached, and Fig. 4 a longitudinal section through the pliers in a lengthwise direction of its pivot. Fig. 5 is a face view of the under cutter detached. Fig. 6 represents a side view of a similar pair of pliers, with its cutters constructed to have a nipping action, and otherwise altered to provide for their retention and the adjustment of one of them.

Similar letters of reference indicate corresponding parts throughout the several figures.

Referring, in the first instance, to Figs. 1, 2, 3, 4, and 5 of the drawing, A and A' represent the two limbs of the implement constructed to form holding-jaws $a\ a'$ at their forward ends and handles $b\ b'$ at their rear. The one A of these limbs has its knuckle portion B of a hollow or circular box-like form, cut away, as at $c\ c$, to allow of the necessary movement of the limbs relatively to each other about a central pivot, $d$. Said box-like knuckle portion is also cut away at its back, as at $e$, to allow of the passage through it of the wire or other article to be cut, and is, furthermore, recessed on its face edge, as at $f\ f$, and formed with teats $g\ g$ to receive and hold the cutting knuckle-plate C. The other limb A' is recessed or reduced, as at $h$, preferably on both sides of its knuckle portion B', and formed with a cavity, $i$, also with a central hole for the passage of the pivot through it. Thus constructed, the limb A' is entered, at its knuckle portion B', within the box-like knuckle portion B of the limb A, as represented in Fig. 2, and a plate-like cutter, D, inserted within the side recess $h$ of the knuckle portion B', said cutter being shaped to fit said recess and having a cavity, $k$, in it corresponding with the cavity $i$, and provided with a hole for the passage of the pivot through its central portion, which is preferably of a circular form, corresponding with the box-like knuckle B that serves to receive it. This being done, the knuckle-plate C, which is notched, as at $l\ l$, to fit the teats $g\ g$, and is reduced or shaped to form a cutter, $m$, is laid within the recesses $f\ f$ of the limb A over the cutter D, and the rivet, pin, or screw $d$ passes through the box-like portion B of the knuckle, through the knuckle portion B', and through the cutter D and cutting knuckle-plate C.

Thus put together, the implement is ready for use either as a holding-pliers at its jaw portions $a\ a'$, or as a cutting-pliers by its cutters D and C or portion $m$ of the latter, said cutters preferably being arranged to slightly overhang their supporting surfaces at or near their cutting-edges and to pass the one under or over the other, so that they have a shearing action. To give the implement a nipping cut, as contradistinguished from a shearing one, the cutter D is constructed, as represented in Fig. 6, with a raised cutting-projection, s, on it to bring its cutting edge on a level with the cutting-edge of the plate C, and both cutting-edges beveled from underneath to effect the cut; also, the plate C, formed with a cavity, n, for play or movement of the cutting projection s within it. Furthermore, in this Fig. 6 the cutter D and the recess h in which it fits are formed with V or other equivalently-shaped ends to effect a more secure hold of said cutter against shifting, and the knuckle-plate C, which forms the other cutter, instead of being held by teats against turning, is made capable of turning on the pivot d, but is prevented from flying from its cut and is made adjustable relatively to the other cutter, as required, by means of an adjusting-stop in the form of a set-screw, u, fitted through a projection on the one limb and bearing against an ear, v, of the knuckle-plate. These changes are equally applicable when the pliers have a shearing cut, as referred to in the previous figures of the drawing; or the cutter D and the cutting knuckle-plate C, in Fig. 6, may be fitted and secured, if preferred, as described in said previous figures.

What is here claimed, and desired to be secured by Letters Patent, is—

1. The combination, with the limbs A A', of the cutting knuckle-plate C and detachable cutter D, arranged in relation to each other, to the jaws a a', and to the pivot d of the pliers, essentially as described.

2. The limbs A A', constructed to lie, at their knuckle portions B B', the one within the other, and provided with cavities e and i, in combination with the cutters D and cutting knuckle-plate C, fitted to said limbs substantially as described, and secured, in common with the limbs, by the rivet or pivot d, about which the whole works, essentially as specified.

3. The combination, with the cutting knuckle-plate C, of the adjusting-screw or stop u, the pivot d, the cutter D, and the limbs A A' having holding-jaws a a', substantially as specified.

NATHAN THOMPSON.

Witnesses:
 FRED HAYNES,
 R. E. RABEAU.